United States Patent
Schon et al.

(10) Patent No.: US 9,400,655 B2
(45) Date of Patent: Jul. 26, 2016

(54) TECHNIQUE FOR FREEING RENAMED REGISTERS

(71) Applicant: ARM Limited, Cambridge (GB)

(72) Inventors: Guillaume Schon, Nice (FR); Cedric Denis Robert Airaud, Nice (FR); Frederic Jean Denis Arsanto, Nice (FR); Luca Scalabrino, Nice (FR)

(73) Assignee: ARM Limited, Cambridge (GB)

( * ) Notice: Subject to any disclaimer, the term of this patent is extended or adjusted under 35 U.S.C. 154(b) by 649 days.

(21) Appl. No.: 13/847,892

(22) Filed: Mar. 20, 2013

(65) Prior Publication Data
US 2014/0289501 A1 Sep. 25, 2014

(51) Int. Cl.
*G06F 9/30* (2006.01)
*G06F 9/40* (2006.01)
*G06F 9/38* (2006.01)

(52) U.S. Cl.
CPC .......... *G06F 9/3017* (2013.01); *G06F 9/30098* (2013.01); *G06F 9/384* (2013.01); *G06F 9/3857* (2013.01); *G06F 9/3863* (2013.01)

(58) Field of Classification Search
CPC .................................................. G06F 9/30098
USPC ......................................................... 712/217
See application file for complete search history.

(56) References Cited

U.S. PATENT DOCUMENTS

| 7,155,599 | B2 * | 12/2006 | Jourdan | G06F 9/3836 |
| | | | | 712/227 |
| 2008/0114966 | A1 | 5/2008 | Begon et al. | |
| 2012/0005444 | A1 | 1/2012 | Rupley et al. | |
| 2012/0278596 | A1 | 11/2012 | Tran | |

OTHER PUBLICATIONS

UK Search Report issued Jun. 16, 2014 in GB 1322852.3, 3 pages.
H. Zeng et al, "Register Versioning: A Low-Complexity Implementation of Register Renaming in Out-of-Order Microarchitectures" 2009 International Conference on Parallel Processing, pp. 453-461.
E. Gafni et al, "Test&Set, Adaptive Renaming and Set Agreement: a Guided Visit to Asynchronous Computability" 26$^{th}$ IEEE International Symposium on Reliable Distributed Systems, pp. 93-102.
D. Sima, "The Design Space of Register Renaming Techniques" IEEE 2000, pp. 70-83.
J. Alastruey et al, "Microarchitectural Support for Speculative Register Renaming" IEEE, 2007, 10 pages.

(Continued)

*Primary Examiner* — Chun-Kuan Lee
(74) *Attorney, Agent, or Firm* — Nixon & Vanderhye P.C.

(57) ABSTRACT

Register renaming circuitry for a processing apparatus configured to process a stream of instructions from an instruction set specifying registers from an architectural set of registers. The apparatus including a physical set of registers configured to store data values being processed by the processing apparatus. Register renaming circuitry is configured to receive a stream of operations from an instruction decoder and to map registers that are to be written to by the stream of operations to physical registers within the physical set of registers that are currently available. The register renaming circuitry comprises register release circuitry configured to release the physical registers that have been mapped to the registers when a first set of conditions have been met, and to release the physical registers that have been mapped to the additional registers when a second set of conditions have been met.

20 Claims, 10 Drawing Sheets

(56) References Cited

OTHER PUBLICATIONS

T.N. Buti et al, "Organization and implementation of the register-renaming mapper for out-of-order IBM POWER4 processors" IBM J. Res. & Dev., vol. 49, No. 1, Jan. 2005, pp. 167-188.

G. Kucuk et al, "Reducing power dissipation of register alias tables in high-performance processors" IEE Proc.-Comput. Digit. Tech., vol. 152, No. 6, Nov. 2005, pp. 739-746.

* cited by examiner

TECHNIQUE FOR FREEING RENAMED REGISTERS

BACKGROUND

The field of the invention relates to data processing and in particular to register renaming in a processing apparatus.

It is known to provide data processing apparatus which process instructions from an instruction set that specifies registers using an architectural set of registers, while the apparatus itself uses a physical set of registers that is larger than the architectural set. This is a technique that has been developed to try to avoid resource conflicts due to instructions executing out of order in the processor. In order to have compact instruction encodings most processor instruction sets have a small set of register locations that can be directly named. These are often referred to as the architecture registers and in many ARM® (registered trade mark of ARM Ltd Cambridge UK) RISC instruction sets there will be 32 architecture registers.

When instructions are processed different instructions take different amounts of time to complete. In order to speed up execution times, processors may have multiple execution units, and may perform out of order execution. This can cause problems if the data used by these instructions is stored in a very limited register set as a value stored in one register may be overwritten before it is used by another instruction. This leads to errors. In order to address this problem it is known for some processing cores to perform processing using more registers than are specified in the instruction set. Thus, for example, a core may have 56 physical registers to process an instruction set having 32 architecture registers. This enables a core to store values in more registers than is specified by the instruction set and can enable a value needed by an instruction that takes a long time to be executed to be stored in a register not used by other neighbouring instructions. In order to be able to do this the core needs to "rename" the registers referred to in the instruction set so that they refer to the physical registers in the core. In other words an architectural register referred to in the instruction is mapped onto a physical register that is actually present on the core.

Renaming of the registers is generally done using a renaming table which maps registers from the architecture set of registers to registers in the physical set. The renaming occurs early in the processing pipeline generally shortly after decode and it is important that the mapping is kept until the instruction has completed and any other instruction that needs to read from the register written to has also completed. However, at a certain point the physical register that was mapped to the architectural register will need to be released so that it can be used in another mapping otherwise the processor will run out of physical registers to map to. Generally a set of conditions are applied that when met indicate that a mapping is no longer required and the physical register can be released. The conditions include that the register write has been performed and that the mapping is no longer in the renaming table. There are further conditions that are required in processors where exceptions may occur to ensure that the processor can be restarted following an exception, thus, the mappings that were current at a point where speculative execution starts need to be stored in a restore table and the physical registers present in this table should not be remapped until it is known that the speculatively executed instructions will complete. An exception may occur where instructions are executed speculatively and it is determined that the prediction that triggered the execution was not correct. Non-exception instructions are instructions that execute in a statically determined way such that it is known that they will complete.

Further problems may arise for source registers of store instructions which may have a very long latency if the store misses at the address translation level, where a virtual address is translated to a physical address, whereupon the instruction may remain stalled for a long time during which time the physical register used to hold the value that is to be written to memory must not be overwritten by another instruction thus, it must not be available for renaming. This is addressed using a "snapshot" where a record of source registers for pending stores is kept and the state of the processor core monitored, the register renaming circuitry avoids renaming these registers until it is determined that the store has completed.

Thus, the conditions for freeing renamed registers are in cases complex and can lead to registers being unavailable for a significant amount of time. It would be desirable to be able to identify situations where registers do not need to meet all of these conditions such that they can be freed more quickly and easily.

SUMMARY

A first aspect of the present technique provides register renaming circuitry for a processing apparatus, said processing apparatus being configured to process a stream of instructions from an instruction set, said instructions specifying registers from an architectural set of registers, said processing apparatus comprising a physical set of registers configured to store data values being processed by said processing apparatus;

said register renaming circuitry being configured to receive a stream of operations from an instruction decoder within said processing apparatus and to map registers that are to be written to by said stream of operations to physical registers within said physical set of registers that are currently available;

said register renaming circuitry being configured to identify additional registers that are registers that are to be written to by said operations that are not from said architectural set of registers;

said register renaming circuitry comprising register release circuitry for releasing physical registers that have been mapped such that they are available for register renaming;

said register release circuitry being configured to release said physical registers that have been mapped to said registers from said set of architectural registers when a first set of conditions have been met, and to release said physical registers that have been mapped to said additional registers when a second set of conditions have been met, at least some of said conditions within said first set of conditions being different to said conditions within said second set of conditions.

The present technique recognises that where registers are being mapped that are not part of the architectural set of registers then, they are not visible to the programmer and they may have different properties and their use may follow different rules. In such a case then the conditions that generally need to be applied to release mapped architectural registers the so called first set of conditions may not apply to these registers and the recognition of this allows a different or second set of conditions to be followed which in many cases are simpler and allow a quicker way of determining when the registers may be freed.

In this regard the second set of conditions are generally less restrictive than the first set of conditions so that the registers may be freed more quickly and with generally a lower requirement for monitoring the state of the processing apparatus.

In some embodiments, said stream of operations comprise at least some micro-operations, wherein said micro-operations are generated by said instruction decoder by splitting at least one of said instructions from said stream of instructions into a plurality of said micro-operations, at least one of said micro-operations specifying at least one of said additional registers.

One case that may arise where registers additional to those within the architectural set are specified by an operation is where the decoder splits an instruction into a set of micro-operations. These micro-operations may need to transmit data between themselves and to do this they use what are often called temporary or additional registers. One of the micro-operations will therefore specify a register it is to write to and another will read from this register. In such a case, as these registers are not in the architectural set, other instructions will not access these registers and thus, when the micro-operations that the instruction was formed into have completed the value stored in the register will no longer be required and the physical register used to store this value can be freed. Thus, provided one can determine when the micro-operations have completed some of the more general constraints required to free a register may be ignored in this case.

In some embodiments, said register renaming circuitry comprises at least one counter associated with said at least one additional register, said register renaming circuitry is configured in response to receiving a micro-operation that writes to said at least one additional register to commence counting, said second set of conditions including said counter associated with said additional register having counted to a predetermined value.

One simple and area efficient way of determining one of the second set of conditions that needs to be met to free a register is by the use of a counter. As noted previously, where an instruction is divided into two micro-operations it is only the micro-operations that came from the original instructions that will require the use of particular register(s). Therefore, if one knows the number of micro-operations that the instruction was split into when that number of micro-operations has passed through the renaming circuitry one can deduce that the register(s) used by the micro-operations are no longer required and that they can therefore be freed as far as this portion of the circuit is concerned. Thus, a counter associated with the register renaming circuitry and the additional register(s) can be used to determine one of the second set of conditions for determining when a physical register can be freed.

In some embodiments, said counter counts a number of clock cycles while in other embodiments said counter counts a number of operations received at said register renaming circuitry.

The number of micro-operations that pass through the renaming circuitry determines when the split instruction has gone through the renaming circuitry. However, it is also recognised that in normal operation the register renaming circuitry receives an operation for every clock cycle. Thus, rather than counting operations one can count clock cycles. An advantage of this is that clock cycles may be simpler to count than operations and also where the register renaming circuitry does not receive an operation on each clock cycle then an exception will have occurred which has resulted in some stalling of the processing circuitry. In such a case, it is likely that the following micro-operations will not be the ones from the instruction generating the earlier micro-operations and thus, the counting may as well continue and this condition be met as this instruction will not complete and the register renaming issues will be handled by exception circuitry.

In some embodiments, said predetermined value comprises a maximum number for all of said instructions that are split into micro-operations by said instruction decoder, of micro-operations between a micro-operation that is writing to said additional register and a micro-operation that reads said additional register.

Although, the counters could be set to the number of micro-operations that each instruction is split into, it has been recognised that where the counter is set to count to a higher value than is required, then it will simply continue counting when subsequent operations are received and will therefore reach the required value in time. As other conditions in the second set of conditions will generally take longer to be fulfilled than the counter value reaching the desired value then this is generally not a problem. Thus, the value chosen may be the maximum number for all of the instructions that are split into micro-operations between the micro-operation that is writing to the additional register and the final micro-operation that reads from it. This is the maximum value that is ever going to be needed. It should be noted that the counter needs to count to this value and this can be either done by setting it to 0 and recognising when it reaches this value or it can be set to that value and count down and the circuitry can recognise when it reaches 0, or some other means of counting can be used.

In some embodiments, said second set of conditions further comprises that said mapped register has been written to, said second set of conditions being met when said counter associated with said additional register has counted to said predetermined value and said physical register that said additional register was mapped to has been written to.

An additional constraint that needs to be met is that the physical register that the additional register was mapped to has been written to. In this regard, the register renaming circuitry will be in the processing pipeline of the apparatus and it may take some time between the registers being renamed and the register being written. As the instruction has already entered the pipeline when it is renamed the operations will flow through to the writing stage in order and thus, once one knows from the counter value that the micro-operations have left the register renaming circuitry and once one knows that the register has been written, the conditions to free it have been met as one can be sure that the operations that are reading the register will be executed before any operations that might write to the register provided no exception occurs. If an exception occurs between the writing of the register and the reading of it then the fact that it is freed also does not matter as the operations that needed to read the register will not complete.

As can be appreciated the second set of conditions in this case are simply that the register has been written to and that the counter has reached a predetermined value. These are simple conditions to monitor and occur quite quickly allowing the registers to be freed in a simple and efficient manner.

In some embodiments, said physical registers comprise a valid indicator associated with them, said register renaming circuitry being configured to set said valid indicator to invalid on mapping a physical register, said valid indicator being set to valid when said register is written.

One way the register renaming circuitry can determine when the physical register has been written to is by the use of a valid indicator associated with the physical register bank. In such a case the register renaming circuitry will set this indicator to invalid when it remaps the register and on the register being written the data processing apparatus will set it to valid. The register renaming circuitry will recognise that the register has been written when it detects the valid signal.

In some embodiments, said register renaming circuitry is further configured to determine when an operation is received that writes to one of said additional registers that is currently mapped and stored in a renaming buffer, said register renaming circuitry being configured to generate a signal to indicate to said register release circuitry that said counter associated with said one of said additional registers has reached said predetermined value irrespective of a value of said counter and to reset said counter.

In some cases, the register renaming circuitry will receive a write to one of the additional registers when it is currently mapped. In such a case, the register renaming circuitry will recognise that all of the operations that might have read that mapped register will have completed, as operations to the renaming circuitry are received in order. Thus, it will reset the counter to a starting value as it will need to count the next set of micro-operations but it will send a signal indicating that the counter has reached the required value for the previously mapped physical register even if it has not reached this value. This is because it knows that the micro-operations have completed and the counter is counting to the value of the maximum number of micro-operations of all split instructions. Thus, if the instruction is split into fewer micro-operations than the maximum value set for the counter, a new operation may be received from a different instruction prior to the counter reaching the required value and this can be used as the signal to reset the counter and indicate that the condition of the counter reaching the required value has been met.

In some embodiments, said register renaming circuitry further comprises a renaming buffer for storing a plurality of mappings of said registers specified by said operations received from said instruction decoder at said register renaming circuitry to said physical registers, said register renaming circuitry being configured to add a new mapping to said renaming buffer on receipt of an operation specifying a register and on receipt of an operation specifying a register that is already mapped in said renaming buffer to remove said mapping from said renaming buffer and to update said renaming buffer with a new mapping;

and said first set of conditions comprises that:

said physical register has been written to:

said physical register is not present in said renaming buffer; and said physical register is not stored in said data processing apparatus as a restore register for restoring a set of mapping that was valid at a point prior to execution of speculative instructions.

As noted previously the first set of conditions are generally more restrictive than the second set of conditions as the registers from the architectural set can be referred to by different instructions within the instruction stream and thus, the moment they can be freed is constrained by various factors. Thus, as for the additional registers, the physical register should have been written to, but in addition to this they should not be present in the renaming buffer and should not be present as a restore register. Restore registers are registers that are present in restore mappings that the processing apparatus stores in order to be able to restore a state of the processing apparatus following an exception. Many processors execute instructions speculatively assuming that certain conditions will be met. If these conditions are not met then an exception is generated and the processor needs to be able to rewind back to a point before the instructions were speculatively executed. Where register renaming occurs the previous mappings at that point also need to be restored and the values in the physical registers mapped by these mappings must not have been overwritten. Thus, any register that may have its mapping restored should not be freed as the value stored in that register may yet be needed. The additional registers do not suffer from these constraints as they are not specified by other instructions but are only used by other micro-operations generated from the same instruction and thus, a point that the apparatus may wind back to is not a point where one of them is written and the value in it needed by subsequent instructions that will be executed.

In some embodiments, said first set of conditions further comprises that said physical register is not mapped to a source register of a decoded store instruction that has not completed.

A further constraint that the first set of conditions may have to follow is where a source register of a decoded store instruction has not completed. Store instructions store values from registers into memory. They can have considerable latency and it is important that the register is not overwritten before the value is stored. Thus, these registers need to be monitored when freeing registers for renaming.

A second aspect of the present technique provides a data processing apparatus comprising:

a register bank comprising a set of physical registers;

at least one instruction decoder for decoding a stream of instructions;

register renaming circuitry according to a first aspect of the present invention; and at least one processor for processing said stream of instructions.

In some embodiments, said at least one data processor comprises a data engine; and said at least one instruction decoder is configured to split at least one predetermined instruction from said stream of instructions into a plurality of micro-operations and to send said plurality of micro-operations to be processed by said data engine.

The processing apparatus may comprise a data engine either on its own or in conjunction with another controlling processor. If a controlling processor is present, the controlling processor may have its own instruction decoder which recognises instructions that are to be processed by the data engine and transmits them to the instruction decoder of the data engine. The instruction decoder of the data engine will split at least some of these instructions into micro-operations that are to be processed by the data engine. These micro-operations may specify additional registers which when mapped are freed according to the second set of conditions.

In some embodiments, said register bank comprises a valid bit associated with each of said registers, said register renaming circuitry being configured when mapping a physical register to update said valid bit associated with said physical register to invalid and said data processing apparatus being configured to set said valid bit to valid on writing to said physical register.

As noted previously, one way of determining when a register is written is by the use of a valid bit which is set to invalid by the register renaming circuitry when mapping a physical register and is set to valid by the processing circuitry when writing to the physical register.

In some embodiments, said data processing apparatus further comprises exception handling circuitry for handling exceptions, said exception handling circuitry comprising:

an exception data store for storing register mappings for registers written to by operations that are speculatively executed and restore mappings for said registers, such that if an exception occurs said mapping can be restored to a previous state;

said register renaming circuitry being responsive to receipt of an exception to update said renaming table using said restore mappings from said exception data store, and to determine whether at least one of said additional registers has been mapped by said speculatively executed operations that are aborted and if so to generate a signal to indicate to said register release circuitry that said second set of conditions is met when said at least one counter associated with said at least one of said additional registers has counted to said predetermined value.

Where data processing apparatus execute instructions speculatively then where the speculatively executed instructions need to be aborted as they should not be executed, exception handling circuitry is required to be able to rewind back to the place where the speculation started. Where register renaming occurs then the previous mappings at this point need to be stored and the physical registers of these mappings should not have been freed as the values stored in them will be needed. Thus, the exception handling circuitry comprises an exception data store that stores information regarding the mappings for each register that are specified by each speculatively executed operation and a previous restore mapping indicating a previous mapping for that register. Where an exception occurs and the speculatively executed operations are aborted, the renaming table is updated with the restore mappings and where any of the additional registers have been mapped by the speculatively executed operations a signal is generated to indicate to said register release circuitry that the second set of conditions is met when the counter has counted to the predetermined value. In this regard, where an exception occurs it may be that the register is never written and therefore, if no signal is sent from the exception circuitry the second set of conditions might never be met and the register never released. Thus, some record of the renaming of the additional register is kept within the exception circuitry and this is used to override the writing to the register condition, perhaps by masking the invalid indicator or forcing it to valid.

In some embodiments said data processing apparatus further comprises an exception handling circuitry configured in response to detecting an exception to force any pending writes to said at least one additional register to complete prior to flushing operations from said processor.

An alternative method of handling the exception is simply to force any pending writes to the additional registers to complete before flushing operations from the processor. This will set the valid bit to valid and will enable the second set of conditions to be met when the counter has reached the value.

In this regard, although the forcing of the writes will achieve correct operation, the use of the exception data store to store information about the additional register may be simpler as it reuses the hardware of the exception data store that is required for restoring the values in any case and does not require monitoring and control of the pipeline.

A third aspect of the present invention provides a method of renaming registers within a processing apparatus, said processing apparatus being configured to process a stream of instructions from an instruction set, said instructions specifying registers from an architectural set of registers, said processing apparatus comprising a physical set of registers configured to store data values being processed by said processing apparatus;

said method comprising:
receiving a stream of operations from an instruction decoder within said processing apparatus and mapping registers that are to be written to by said stream of operations to physical registers within said physical set of registers that are currently available;

identifying additional registers that are registers that are to be written to by said operations that are not from said architectural set of registers;

releasing said physical registers that have been mapped to said registers from said set of architectural registers such that they are available for remapping when a first set of conditions have been met, and releasing said physical registers that have been mapped to said additional registers such that they are available for remapping, when a second set of conditions have been met, at least some of said conditions within said first set of conditions being different to said conditions within said second set of conditions.

A fourth aspect of the present invention provides, register renaming means for renaming registers for a processing means, said processing mean being for processing a stream of instructions from an instruction set, said instructions specifying registers from an architectural set of registers, said processing means comprising a physical set of registers configured to store data values being processed by said processing means;

said register renaming means being for receiving a stream of operations from an instruction decoding means within said processing means and for mapping registers that are to be written to by said stream of operations to physical registers within said physical set of registers that are currently available;

said register renaming means being for identifying additional registers that are registers that are to be written to by said operations that are not from said architectural set of registers;

said register renaming means comprising register release means for releasing physical registers that have been mapped such that they are available for register renaming;

said register release circuitry being for releasing said physical registers that have been mapped to said registers from said set of architectural registers when a first set of conditions have been met, and for releasing said physical registers that have been mapped to said additional registers when a second set of conditions have been met, at least some of said conditions within said first set of conditions being different to said conditions within said second set of conditions.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
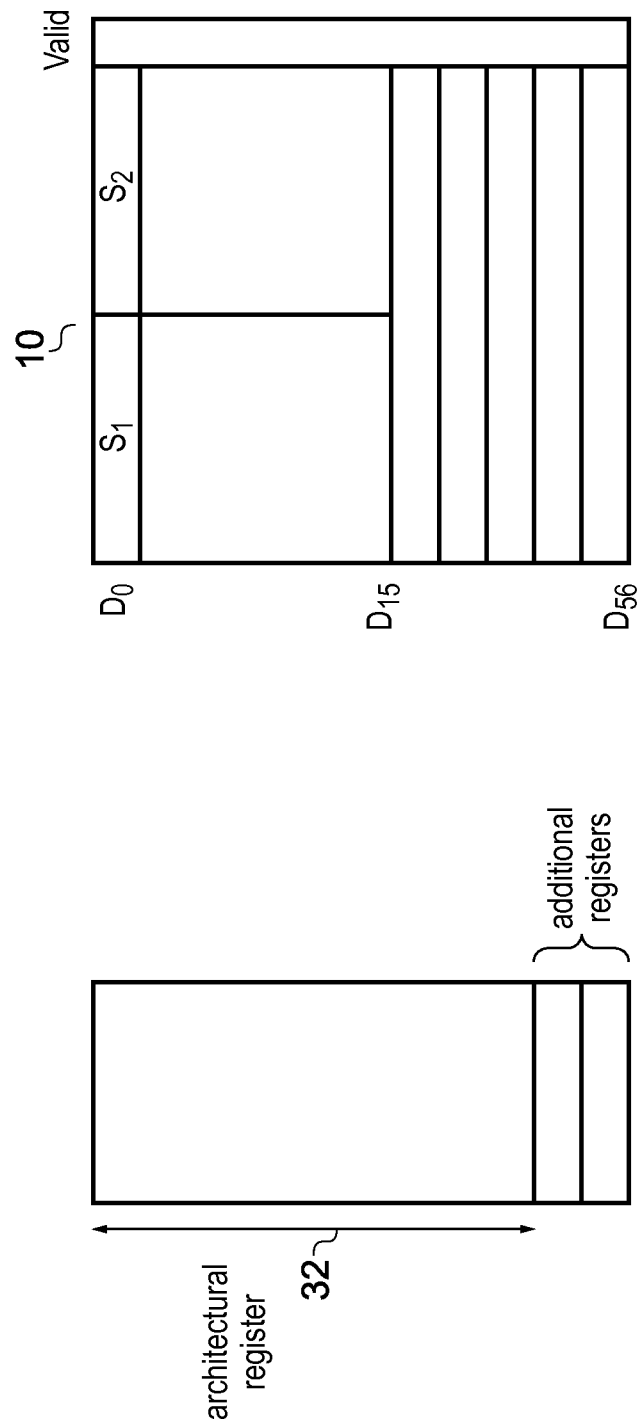
FIG. 1 schematically shows a representation of the renaming table and physical registers.

FIG. 1 schematically shows a renaming table that shows the set of architectural registers that can be named by a programmer's instructions, and an additional two registers that cannot be named by a programmer but can be used by operations executed by a processor, for example operations generated by a decoder decoding certain instructions. Thus, each of these registers when used will need to be mapped to a physical register in the physical register bank 10.

In this example there are 32 architectural registers and thus, five bits are required to identify them. There are an additional two registers and an additional bit is needed to identify these. Thus, in this example, there are six bits that identify the registers specified by the operations, one of the bits indicating whether they are additional registers or not.

FIG. 1 also shows the physical registers that are present in physical register bank 10. In this example they are double data registers such that each register can store 128 bits, there is also an additional valid bit associated with each register. The first 16 registers can be accessed as two sets of single data registers of 64 bits, while the remaining registers are accessed simply as double data registers and if single data is being used the second half of them is not used. There are more physical registers than there are architectural and additional registers and these are provided to enable a processor to process instructions speculatively and out of order. The architectural and additional registers are mapped to actual physical registers and the mappings are stored so that the data that they write can be read by other operations by accessing these registers.

Figure 2:
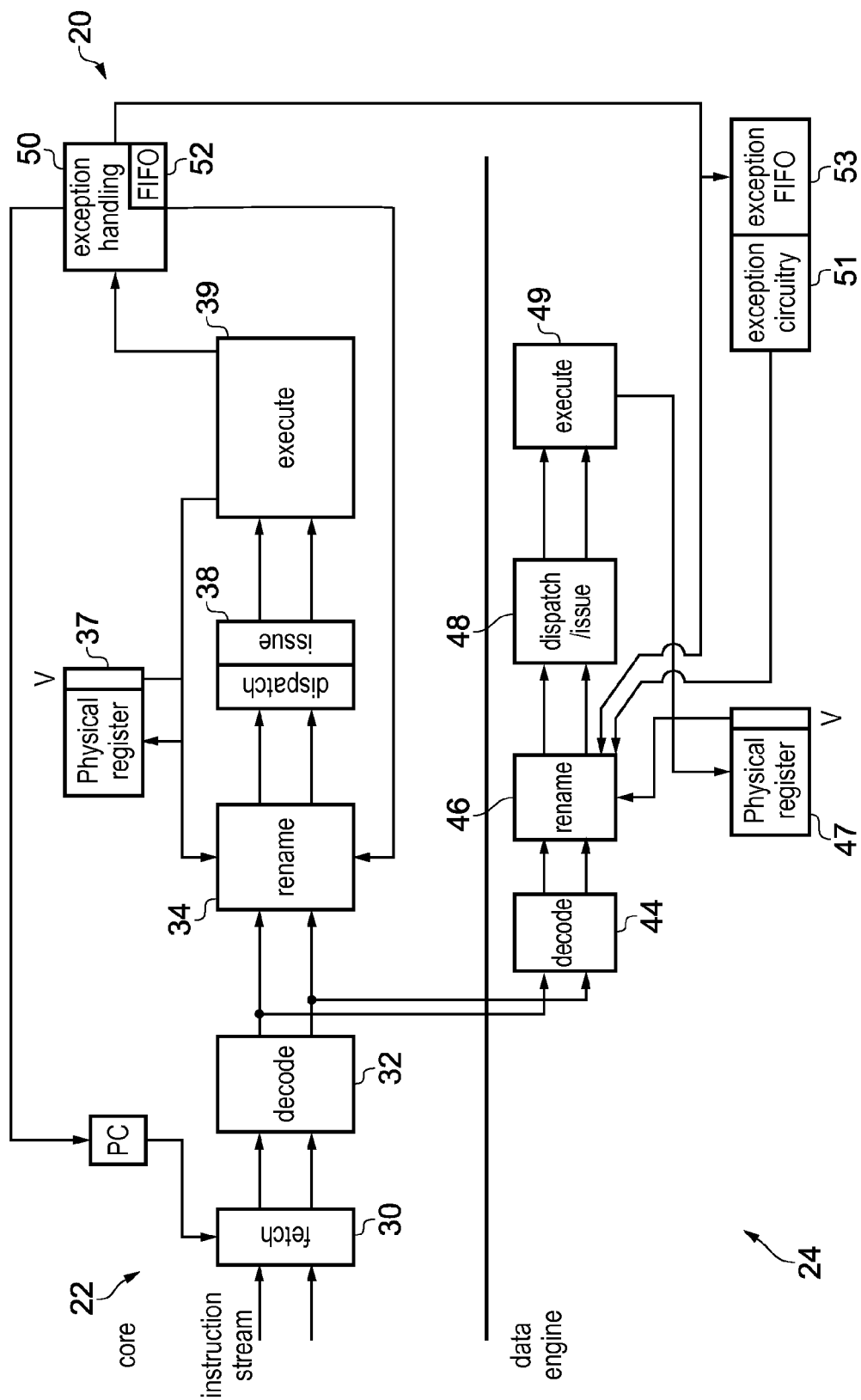
FIG. 2 shows a data processing apparatus according to an embodiment of the present invention.

FIG. 2 shows a data processing apparatus 20 according to an embodiment of the present invention. The data processing apparatus comprises a main processor core 22 and a data engine 24. The processor core has a fetch unit 30 that fetches instructions from an instruction cache not shown and in this example it is a dual stream processing pipeline and therefore there are two instructions fetched in parallel. These instructions are then sent to decode unit 32 where an initial decode is performed. The decode unit identifies instructions that can be efficiently processed by the data engine and sends them to the data engine instruction decoder 44. The other instructions that are not suitable for the data engine are sent onto the renaming circuitry 34 in the processor core pipeline.

The decoding section 44 of the data engine generates and transmits operations to a register renaming section 46 and these are then sent on to a dispatch/issue section 48 and finally to an execution unit 49. The core similarly has a dispatch/issue unit 38 and an execution unit 39.

The instruction decoder 44 of the data engine 24 will determine from the instructions it receives which ones should be split into micro-operations. In this regard, the data engine is designed such that it can process some instructions more efficiently if it divides them into several micro-operations. These micro-operations may need to transfer data between themselves and they use the additional registers of FIG. 1 to do this. These are often called temporary registers as they are only used within an instruction. Thus, decode circuitry 44 will determine which of the partially decoded instructions it receives from decoder 32 should be split into micro-operations and will perform this task. These operations will then be sent onto rename circuitry 46 along with operations generated by the instruction decoder 44 from instructions that are not split.

Rename circuitry 44 and 46 both act to map registers from the architectural register set to registers from the physical register set and in the case of decoder 44 also from the additional registers to the physical registers. Each renaming circuitry 34, 46 maps to physical registers from within their respective physical register banks 37 and 47. These mappings are stored within rename tables in the renaming circuitry 34, 46 and allow later operations that require access to the data written to these registers to locate the actual physical registers where this data is held. Once the renaming circuitry 34, 46 has finished renaming the registers specified by the operation it will send it on to the dispatch issue unit 38, 48 where it will then be sent forward to the respective execution units 39, 49. It should be noted that once the operations reach the renaming circuitry 34, 46 in either pipeline they will stay in order and will be executed in the order that they are received in. This means, that for the instructions that are split into micro-operations one can be sure that once a first micro-operation is received no micro-operations from other instructions will be received until the final micro-operation pertaining to that split instruction has passed through the renaming circuitry 46, unless an exception occurs. This feature means that the conditions that are required to be met for the freeing of these registers for use in future mappings are simpler than those for other operations that are generated directly from instructions.

In this regard, although the mapping of registers by the register renaming circuitry 34, 46 allows for the use of more physical registers than there are architectural register and allows some speculative and out of order execution, it is important that the register renaming circuitry knows when a physical register that has been mapped becomes available for mapping again. In this regard, clearly the sooner they are made available or are freed the fewer actual physical registers will be required by the system.

Where the registers are architectural registers specified by instructions then these instructions may execute out of order and it is complicated to determine when it is safe to free a register. The additional registers are used by micro-operations that are generated within the decode circuitry and thus, will always execute in order and determining when they can be freed is simpler. In this regard the determination of when writing to an additional register has occurred and the determination of when the micro-operations within a split instruction have all been received at the register renaming circuitry may be sufficient to determine when the additional register can be freed.

Further constraints on the freeing of architectural registers occur in processors where speculative execution of instructions happens. In such cases there is a need to be able to restore the processor to the state it had before the speculative execution when an exception occurs and the speculative execution should not have happened.

To address this the data processing apparatus 10 has exception circuitry which includes exception handling unit 50 which has an exception FIFO 52 for storing information regarding the mappings of speculatively executed operations executed by execute unit 39, and exception circuitry 51 which has an exception FIFO 53 for storing information relating to mappings for speculatively executed operations that are executed by execute unit 49 within data engine 24. The exception handling unit 50 forwards feedback information about speculation to the data engine's exception circuitry 51. The exception handling unit 50 also comprises the program counter such that it controls the restart of program execution following a mispeculation.

When registers are renamed in a data processing apparatus that speculatively executes instructions then if an exception occurs and the speculatively executed instructions need to be aborted the processor will need to rewind back to a point before the speculation started. Thus, the state of the processor at that point needs to be stored. Where registers have been renamed the mappings that were current at that point need to be available and in addition to this the actual physical registers used in these mappings should not have been remapped as the data within these registers is required. Thus, exception FIFOs 52 and 53 retain data relating to the mappings of speculatively executed instructions and restore mappings for the registers that the speculatively executed instructions remap. The registers that are present as restore mappings should not be freed as if an exception occurs they will be required.

The exception FIFO 53 also contains information on any additional or temporary registers that are currently mapped by the renaming circuitry. If an exception occurs then the instructions up to the first speculatively executed instruction are completed and then the renaming table within the register renaming circuitry is updated with restore register mappings from the exception FIFO. Furthermore, the register renaming circuitry notes if there is an additional register present in the exception FIFO and if there is then it masks the valid bit for that physical register such that the renaming circuitry 46 believes that the physical register has been written. This means that this additional register can be freed when the other condition of the conditions set for the additional registers has been met, the other condition being that the certain number of micro-operations following the micro-operation that write to this register have passed through the register renaming circuitry or a corresponding number of cycles have passed.

Figure 3:
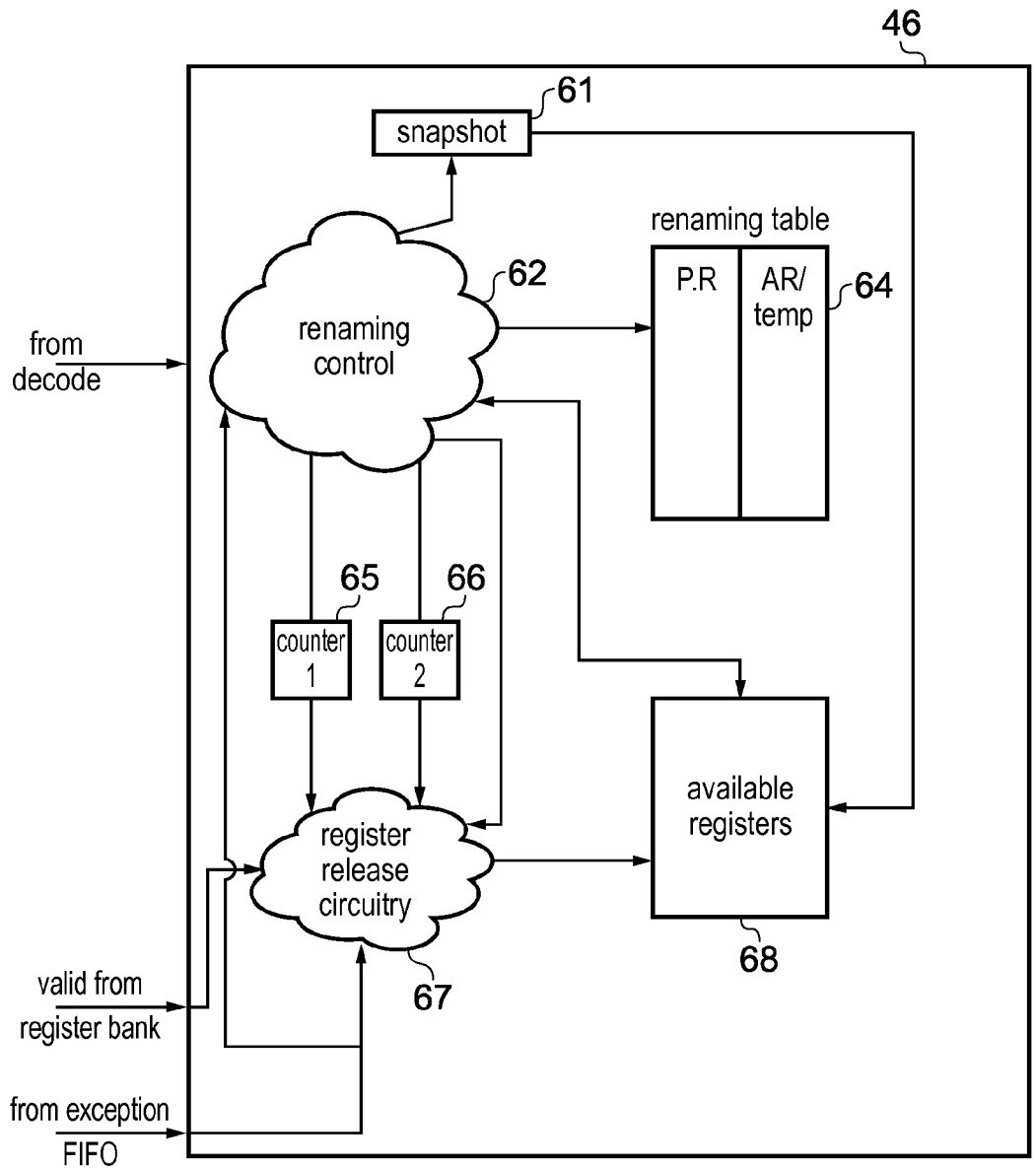
FIG. 3 shows register renaming circuitry according to an embodiment of the present invention.

FIG. 3 shows register renaming circuitry 46 of FIG. 2 in more detail. There is renaming control circuitry 62 which receives the operations from decode and determines from this when a register is to be written to. If there is a register that is to be written then it will map that register to a physical register that it determines is available from the available register table 68 and it will update the renaming table 64. If the register being mapped is already present in the renaming table then it will overwrite the current mapping. If the register mapping that is overwritten is for a temporary or additional register then it will set the counter relating to that register to a predetermined value and it will send a control signal to the register release circuitry indicating that the counter related to that mapping has reached the predetermined value.

When a register that is mapped is an additional register then the counter is set to the predetermined value and starts counting clock cycles. The register renaming circuitry expects to receive an operation at each cycle and thus, where this occurs the counter counting cycles is equivalent to it counting operations, which is what occurs in normal operation. If the pipeline stalls for some reason such as for an exception then operations are no longer received every cycle. However, in such a case the instructions from which the micro-operations were formed will not complete and thus, the fact that the counter indicates that the micro-operations have all been received does not matter as any micro-operation to read the register that might not yet have been received will not be executed.

Counters 65 and 66 relate to the two additional registers and each send signals to register release circuitry 67 which determines when registers that have previously been mapped can be released and stored in available register table 68 to be reused in mappings.

The conditions for freeing the additional registers are that the registers have been written to and this is indicated by receipt of a valid signal from the register bank for that register and that the counter for that register has reached the predetermined value indicating that all of the micro-operations that might read from that register have passed through the renaming circuitry. When these two conditions are met the register release circuitry generates a signal indicating that this physical register is available for renaming and the available table 68 is updated.

With regard to the counters reaching the predetermined value, this value may be set to the number of micro-operations that an instruction is split into. However, in order to simplify the circuitry it may be convenient to use a single predetermined value for all split instructions. This value could be set to be the maximum number of micro-operations that could occur between a micro-operation that writes to an additional register and a micro-operation that reads from it for all instructions that are split into micro-operations. Thus, the counter is set on receipt of a micro-operation that writes to an additional register and when it reaches this value one can be sure that all of the micro-operations that might want to read from the register have been received at the renaming circuitry, whichever instruction was the source of the micro-operations. The micro-operations may all have been received sooner for some instructions that are split into fewer micro-operations, however, as the counter is updated for each cycle the additional number of cycles required to count to the higher value will not cause much delay and may not cause any delay as the additional constraint of the register having been written to will often occur later than the counter reaching the value. Where a micro-operation is received that writes to an additional register while the counter for that register is still counting then the counter is reset and a signal is sent to indicate that the counter has reached the required value, as the receipt of a micro-operation from a different instruction is an indication that the micro-operations generated from the previously split instruction must have completed as they are received in order at the renaming circuitry.

Architectural registers that are remapped have more restrictive conditions to be met before they can be released and thus, the register release circuitry 67 needs to perform the following tasks: monitor the exception FIFO to determine if the physical register is a restore register within the exception FIFO; check the renaming table to check that the mapping is not present in the renaming table; check that the register has been written to and thus a valid indication has come from the register bank; and monitor "snapshot" circuitry 69 which is circuitry whose operation is triggered by the renaming control circuitry 62 detecting a store instruction. A store instruction will store a value of a register to memory. When accessing the memory the instruction may stall if the physical storage location to be accessed is not in the local virtual to physical address translation tables or if there are access permission problems. Thus, the writing of the value to the memory may take a long time and the physical register holding the data must not be remapped during this time. Thus, this snapshot circuitry is used to take note of store instructions and the condition of the core when they are received and to monitor them as they move through the processing apparatus. This is an additional constraint that must be met by physical registers mapped to architectural registers that are to be freed by register release circuitry 67.

Figure 4:
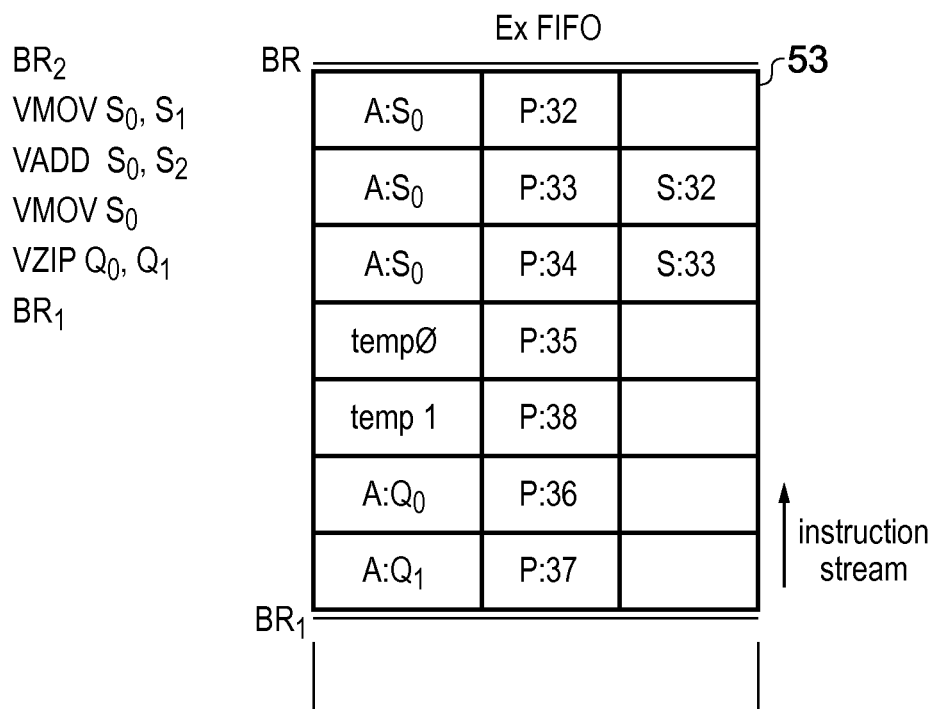
FIG. 4 shows an exception FIFO used in embodiment of the present invention.

An example of exception FIFO 53 of FIG. 2 is shown in FIG. 4. In this example there are instructions that lie between two branch instructions shown. Branch instructions are speculatively executed instructions and are therefore instructions that may generate an exception. If an exception is generated by branch 1 Br1 then all of the instructions up to branch 1 must be completed and as they complete the registers that are associated with them are removed from the exception FIFO 53. The information remaining within the exception FIFO 53 is then used to restore the renaming table when the processing circuit is rewound to this point. Thus, the recovery mapping shown in table 53 are used to update the renaming table. In this case as there was a VZIP instruction which is split into micro-operations and uses temporary registers temp0 and temp1 the exception circuitry masks the valid bit associated with physical register 35 and physical register 38 that the two temp registers are mapped to, such that the register control circuitry believes that it has written to these registers and this condition is met. The register release circuitry will therefore be able to free these registers once the counters related to the registers have reached the required value. If the counters have already reached their values then they will be freed immediately.

Figure 5:
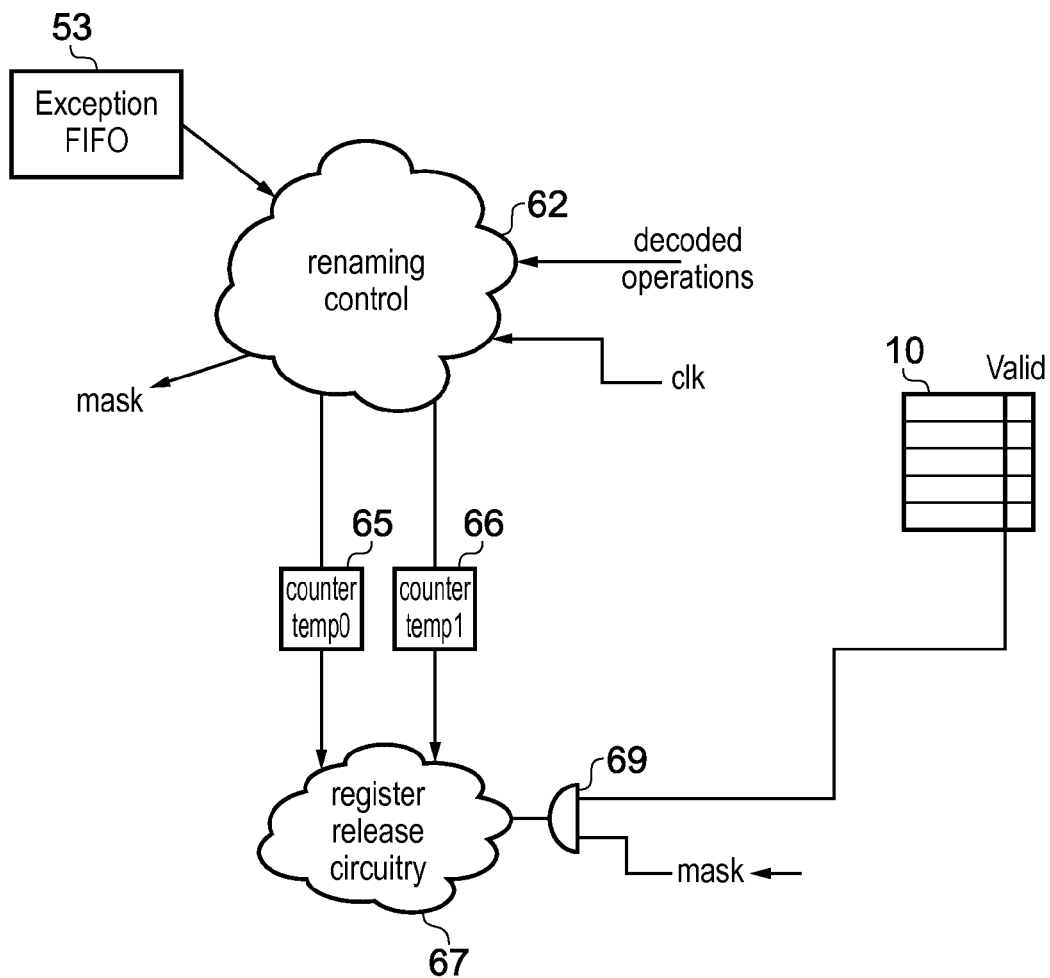
FIG. 5 shows a portion of the register renaming circuitry according to an embodiment of the present invention.

FIG. 5 shows the masking of this valid indicator in more detail. Thus, there is in this Figure renaming control circuitry 62 which receives decoded operations and is clocked by a clock CLK1, there is a counter 65 for temp register temp0 and a counter 66 for a temp register temp1. Register release circuitry 67 monitors the values in these counters and also monitors the valid bit of the physical register that temp0 and temp1 have been mapped to. When the counter related to a temporary register reaches its predetermined value and the valid bit for that register in register bank 10 is set to valid then the register release circuitry 67 will release the physical register that temporary register was mapped to. In the case that an exception occurs and one of the temporary registers was in the exception FIFO 53 then control circuitry 62 will generate a mask signal which will act with mask circuitry 69 to mask the value of the valid bit received for the physical register that the temporary register was mapped to and thus, the register release circuitry sees it as being set and this portion of the condition is met and the register can be released when the counter reaches the required value.

Figure 6:
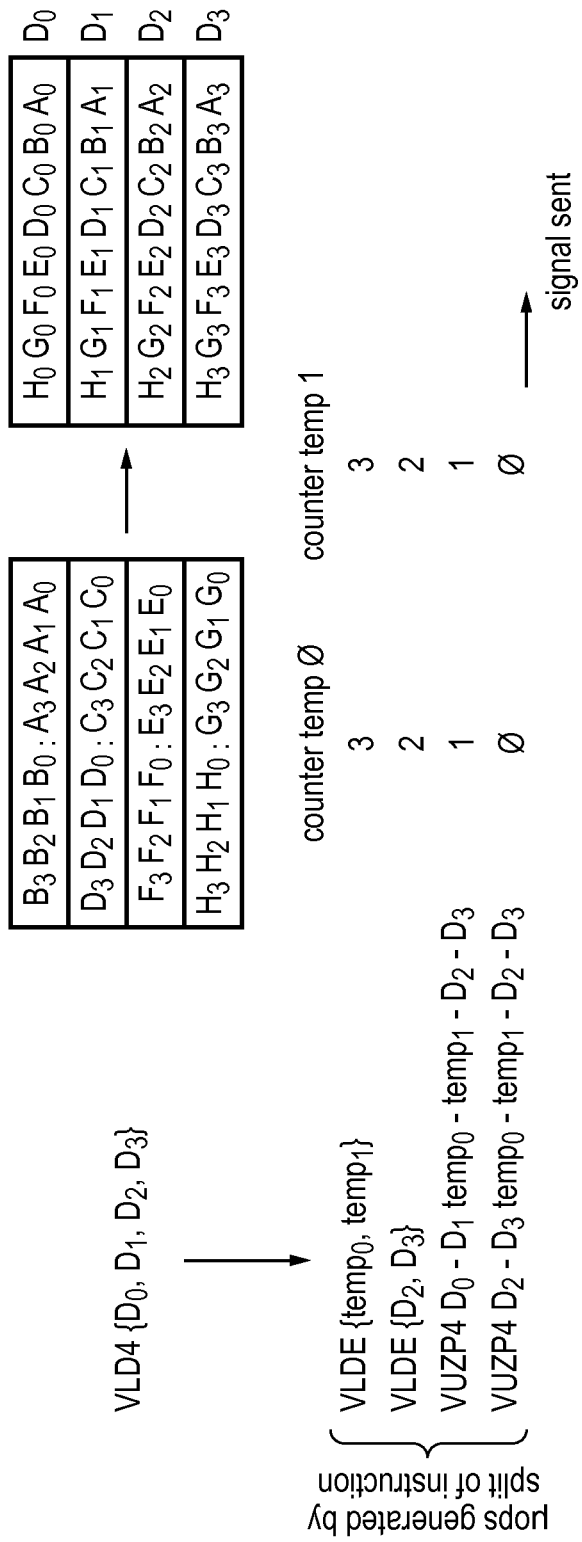
FIG. 6 shows an example of an instruction that is split into micro-operations and the counter values that are set in response to receiving these in the register renaming circuitry.

FIG. 6 shows an example of an instruction that is split into micro-operations. This instruction is a VLD4 instruction and moves data that is stored in memory into a register and reorders it at the same time, the new order being more suitable for the processing operations. In order to do this it requires the use of temporary registers temp0 and temp1 to store the data received from the memory while it is being reordered and prior to writing it to the destination registers. As can be seen the counter is set for each of the temporary registers when they are written to and in this example the maximum number of micro-operations between a micro-operation writing to a register and a later micro-operation reading from that register is 3 and thus, the counters are both set to 3. When each subsequent micro-operation is received the counter is decremented. When the counter reaches 0 and when indication has been received that the temporary register has been written to the physical register that the temporary register was mapped to can be released for remapping.

Figure 7:
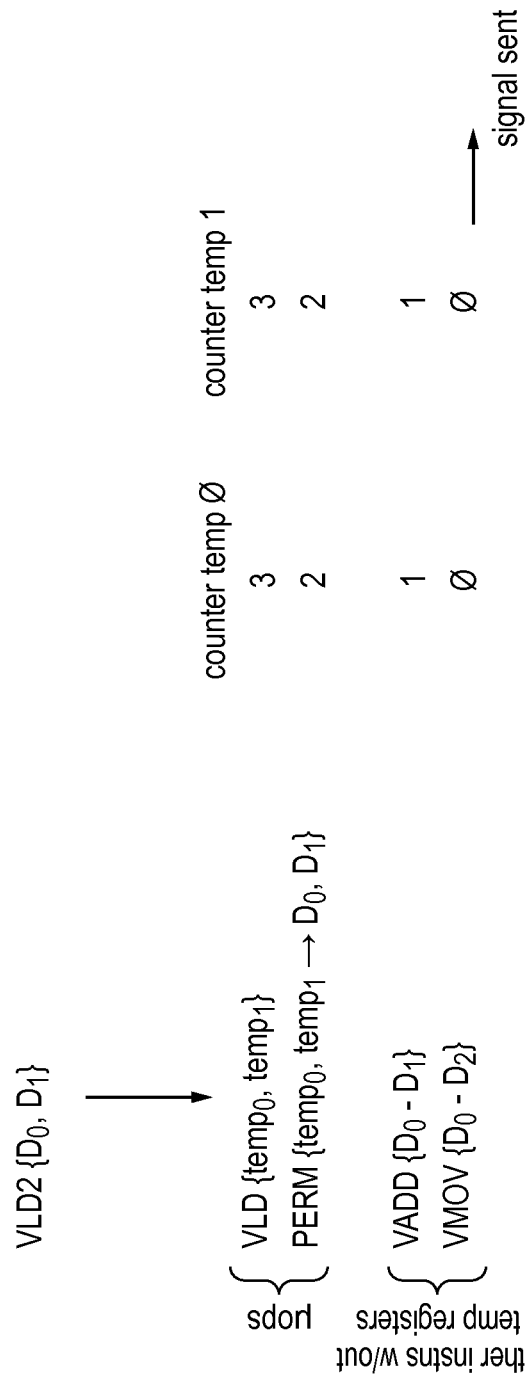
FIG. 7 shows a further example of instructions that are split into micro-operations.

FIG. 7 shows a different example where data is moved from the memory and reordered. In this case, there are two micro-operations that are formed from the instruction and that use the temporary registers. However, although there are only two micro-operations formed, the counter is still set to 3 and thus, when the micro-operations for the split instruction VLD2 have completed the counters have not been decremented to 0 and further operations received by the register renaming circuitry will cause the counter to be decremented further and the counter will in time reach 0 and a signal can be sent to the register release circuitry. It should be noted that although in these examples the counter is set to the predetermined value and decrements to 0 in other embodiments it could be set to 0 and be incremented to the predetermined value and a comparator could be used to determine when it reaches this value.

Figure 8:
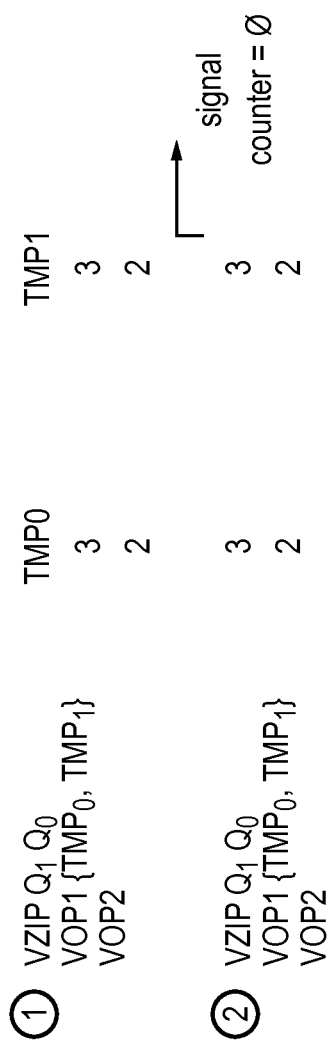
FIG. 8 shows a further example of an instruction stream including an instruction that is split into micro-operations.

FIG. 8 shows an alternative embodiment where two VZIP instructions that use quad registers $Q_0$ and $Q_1$ are split into two micro-operations shown schematically as VOP1 and VOP2 which occur one after the other in the program stream. In such a case the temporary registers need to be written to by the second instruction before the counters for those registers have reached 0. The register renaming circuitry will detect the presence of the temporary registers in the renaming table and in response to this will overwrite them and will also signal to the register release circuitry that the counters have reached a predetermined value. The counters will be reset for the next instruction. In this case, because the counters are set to the maximum value of micro-operations for a split instruction which in this example is three and because this instruction is only split into two micro-operations the counter does not indicate that it is safe to release the physical registers. However, the register renaming circuitry knows that it must be as it has received a write operation to the same registers and as the register renaming circuitry receives the operations in order it knows that it would not receive this operation if the other micro-operations had not completed. Thus, it can send a signal to the register release circuitry that any read operations that might have required these registers have completed which is in effect what the counter signal indicates.

Figure 9:
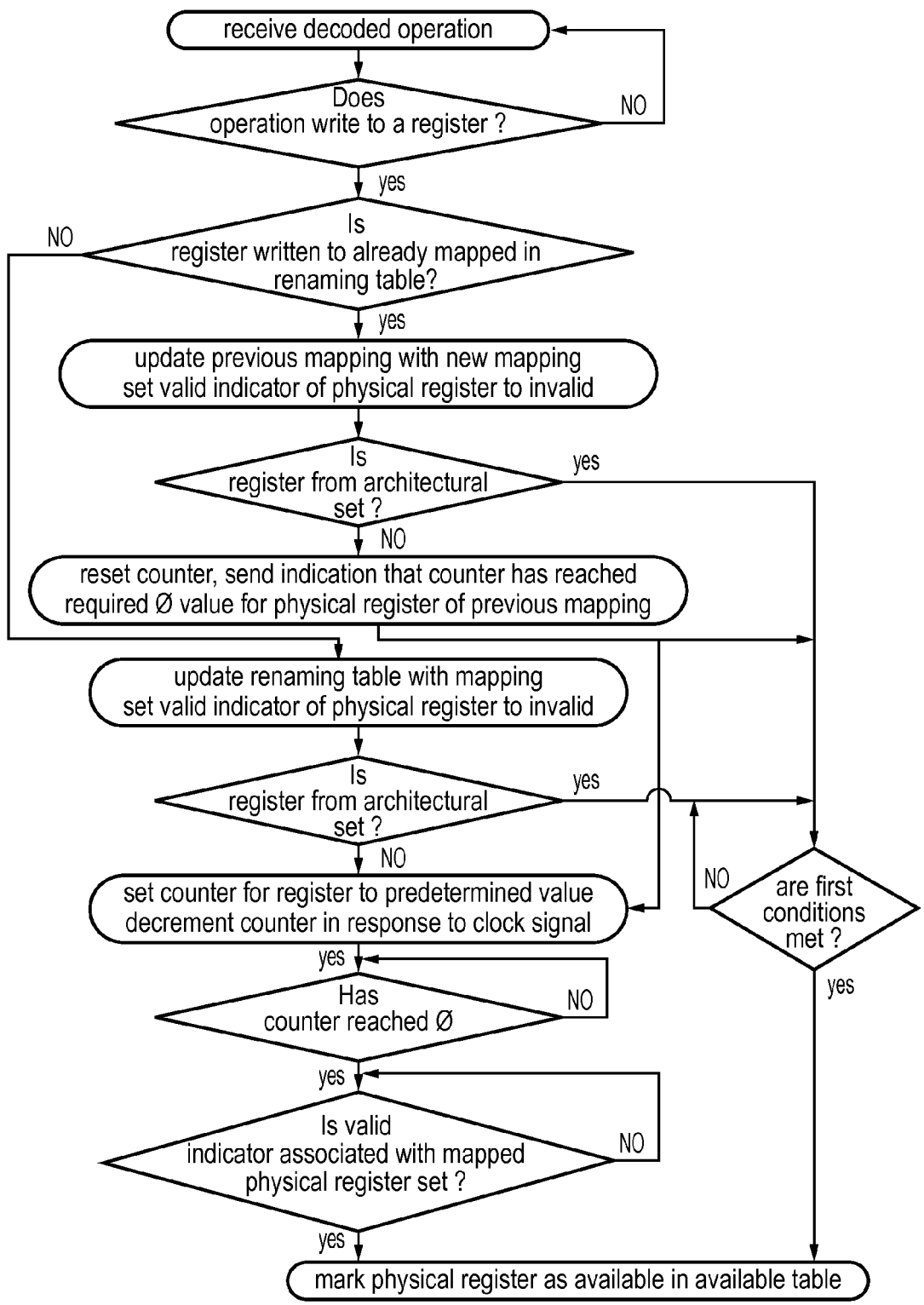
FIG. 9 shows a flow diagram illustrating steps in a method according to an embodiment of the present invention.

FIG. 9 shows a flow diagram illustrating steps in the method for releasing registers that have been renamed according to an embodiment of the present invention. Thus, a decoded operation is received and it is determined if the operation writes to a register. If it does write to a register then it is determined if the register that is to be written to is already mapped in the renaming table. If it is then the previous mapping is updated with a new mapping and the valid bit of the physical register that has been mapped to is set to invalid. It is then determined if the register is from the architectural set. If it is not then it is one of the additional registers and at this point the counter is reset for that register and an indication that the counter has reached the required 0 value in this case for the physical register of the previous mapping is sent to the register release circuitry.

If the register written to was not already mapped in the renaming table then the renaming table is updated with the new mapping and the valid bit set for the physical register is set to invalid and it is then determined if this register is from the architectural set. If it is not this means it is one of the additional registers then the counter for the register is set to the predetermined value. This counter is then decremented in response to the clock signal.

If it is determined during these operations that the register is from the architectural set then the counter is not used and rather it is determined whether the first set of conditions that are used to free architectural registers are met. These include that the register has been written to, that the register is not in the renaming table, that it is not a recover register and it is not in the "snapshot".

For the additional register mappings it is determined if the counter reaches 0. When it does then it is determined if the valid bit associated with the map physical register has been set. If it has then the conditions for the additional register have been met and the physical register is marked as available in the available table. As noted previously there are conditions that occur, that mean that the additional registers can be released before the counter has reached the predetermined value or before the register is written, in such a case signals are sent to the register release circuitry indicating that these conditions have been met even where they have not. When the first conditions are met for architectural registers then the physical register is marked as available in the available table.

Figure 10:
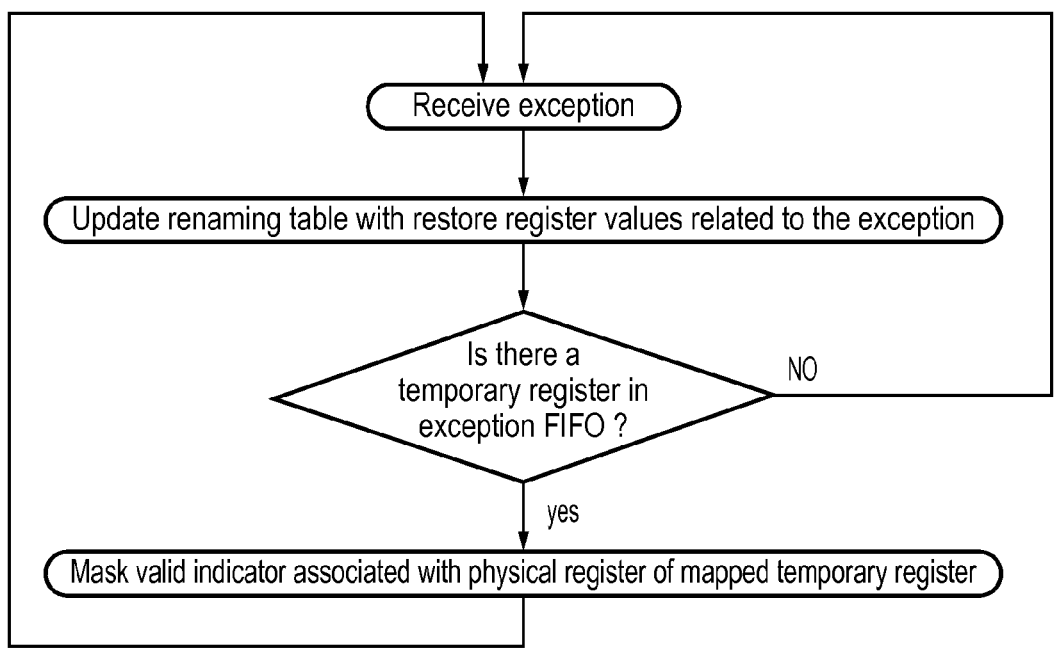
FIG. 10 shows a flow diagram illustrating what happens when an exception is received.

FIG. 10 shows what happens when an exception is received. When the exception is received the instructions up to the first speculative instruction that generated the exception are completed and then the renaming table is updated with the restore register values from the exception table. It is then determined if there is a temporary register within the exception FIFO. If there is then the control signal from the register bank for the physical register that this temporary register is mapped to is masked to appear valid such that this condition from the second set of conditions is met.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Register renaming apparatus for a processing system having a physical set of registers to store data values being processed and in which a stream of instructions from an instruction set is processed, said instructions specifying registers from an architectural set of registers, said register renaming apparatus comprising:
    first circuitry configured to receive a stream of operations from an instruction decoder within said processing apparatus and to map registers that are to be written to by said stream of operations to physical registers within said physical set of registers that are currently available and to identify additional registers that are registers that are to be written to by said operations that are not from said architectural set of registers; and
    second circuitry configured to release physical registers that have been mapped such that they are available for register renaming and to release said physical registers that have been mapped to said registers from said set of architectural registers when a first set of conditions have been met, and to release said physical registers that have been mapped to said additional registers when a second set of conditions have been met, at least some of said conditions within said first set of conditions being different to said conditions within said second set of conditions.

2. Register renaming apparatus according to claim 1, wherein said stream of operations comprise at least some micro-operations, wherein said micro-operations are generated by said instruction decoder by splitting at least one of said instructions from said stream of instructions into a plurality of said micro-operations, at least one of said micro-operations specifying at least one of said additional registers.

3. Register renaming apparatus according to claim 2, further comprising at least one counter associated with said at least one additional register, said first circuitry being configured in response to receiving a micro-operation that writes to said at least one additional register to commence counting, said second set of conditions including said counter associated with said additional register having counted to a predetermined value.

4. Register renaming apparatus according to claim 3, wherein said counter counts a number of clock cycles.

5. Register renaming apparatus according to claim 3, wherein said counter counts a number of operations received at said first circuitry.

6. Register renaming apparatus according to claim 3, wherein said predetermined value comprises a maximum number for all of said instructions that are split into micro-operations by said instruction decoder, of micro-operations between a micro-operation that is writing to said additional register and a micro-operation that reads said additional register.

7. Register renaming apparatus according to claim 3, wherein said second set of conditions further comprises that said mapped register has been written to, said second set of conditions being met when said counter associated with said additional register has counted to said predetermined value and said physical register that said additional register was mapped to has been written to.

8. Register renaming apparatus according to claim 7, wherein said physical registers comprises a valid indicator associated with them, said first circuitry being configured to set said valid indicator to invalid on mapping a physical register, said valid indicator being set to valid when said register is written.

9. Register renaming apparatus according to claim 3, wherein said first circuitry is further configured to determine when an operation is received that writes to one of said additional registers that is currently mapped and stored in a renaming buffer, said first circuitry being configured to generate a signal to indicate to said second circuitry that said counter associated with said one of said additional registers has reached said predetermined value irrespective of a value of said counter and to reset said counter.

10. Register renaming apparatus according to claim 1, further comprising:
    a renaming buffer for storing a plurality of mappings of said registers specified by said operations received from said instruction decoder at said register renaming circuitry to said physical registers, said first circuitry being configured to add a new mapping to said renaming buffer on receipt of an operation specifying a register and on receipt of an operation specifying a register that is already mapped in said renaming buffer to remove said mapping from said renaming buffer and to update said renaming buffer with a new mapping;
    and said first set of conditions comprises that:
    said physical register has been written to:
    said physical register is not present in said renaming buffer; and
    said physical register is not stored in said data processing apparatus as a restore register for restoring a set of mapping that was valid at a point prior to execution of speculative instructions.

11. Register renaming apparatus according to claim 10, wherein said first set of conditions further comprises that said physical register is not mapped to a source register of a decoded store instruction that has not completed.

12. A data processing system comprising:
    a register bank comprising a set of physical registers;
    at least one instruction decoder for decoding a stream of instructions;
    register renaming apparatus according to claim 1; and
    at least one data processor for processing said stream of instructions.

13. A data processing system according to claim 12, wherein said at least one data processor comprises a data engine; and said at least one instruction decoder is configured to split at least one predetermined instruction from said stream of instructions into a plurality of micro-operations and to send said plurality of micro-operations to be processed by said data engine.

14. A data processing system according to claim 12, wherein said register bank comprises a valid bit associated with each of said registers, said first circuitry being configured when mapping a physical register to update said valid bit associated with said physical register to invalid and said data processing apparatus being configured to set said valid bit to valid on writing to said physical register.

15. A data processing system according to claim 12, further comprising exception handling circuitry for handling exceptions, said exception handling circuitry comprising:

an exception data store for storing register mappings for registers written to by operations that are speculatively executed and restore mappings for said registers, such that if an exception occurs said mapping can be restored to a previous state;

said first circuitry being responsive to receipt of an exception to update said renaming table using said restore mappings from said exception data store, and to determine whether at least one of said additional registers has been mapped by said speculatively executed operations that are aborted and if so to generate a signal to indicate to said second circuitry that said second set of conditions is met when said at least one counter associated with said at least one of said additional registers has counted to said predetermined value.

16. A data processing system according to claim 12, further comprising an exception handling circuitry configured in response to detecting an exception to force any pending writes to said at least one additional register to complete prior to flushing operations from said processor.

17. A method of renaming registers within a processing apparatus having a physical set of registers to store data values being processed and in which a stream of instructions from an instruction set is processed, said instructions specifying registers from an architectural set of registers, said method comprising:

receiving a stream of operations from an instruction decoder within said processing apparatus and mapping registers that are to be written to by said stream of operations to physical registers within said physical set of registers that are currently available;

identifying additional registers that are registers that are to be written to by said operations that are not from said architectural set of registers;

releasing said physical registers that have been mapped to said registers from said set of architectural registers such that they are available for remapping when a first set of conditions have been met, and releasing said physical registers that have been mapped to said additional registers such that they are available for remapping, when a second set of conditions have been met, at least some of said conditions within said first set of conditions being different to said conditions within said second set of conditions.

18. A method according to claim 17, wherein said stream of operations comprise at least some micro-operations, said method comprising an initial step of splitting at least one of said instructions from said stream of instructions into a plurality of said micro-operations, at least one of said micro-operations specifying at least one of said additional registers.

19. A method according to claim 18, wherein said method comprises a step of in response to receiving a micro-operation that writes to said at least one additional register commencing counting, said second set of conditions for said at least one additional register including counting to a predetermined value.

20. Apparatus for renaming registers for a processing apparatus having a physical set of registers to store data values being processed and in which a stream of instructions from an instruction set is processed, said instructions specifying registers from an architectural set of registers said apparatus comprising:

means for receiving a stream of operations from an instruction decoder within said processing apparatus and for mapping registers that are to be written to by said stream of operations to physical registers within said physical set of registers that are currently available;

means for identifying additional registers that are registers that are to be written to by said operations that are not from said architectural set of registers;

means for releasing said physical registers that have been mapped to said registers from said set of architectural registers when a first set of conditions have been met; and means for releasing said physical registers that have been mapped to said additional registers when a second set of conditions have been met, at least some of said conditions within said first set of conditions being different to said conditions within said second set of conditions, wherein released physical registers are available for register renaming.

\* \* \* \* \*